Figure 1:
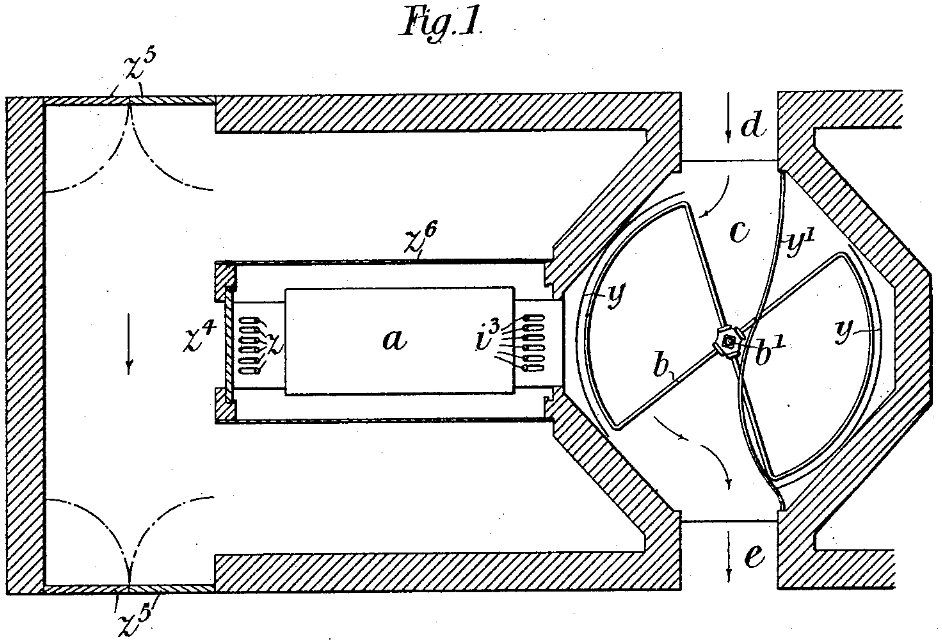

No. 628,095.

Patented July 4, 1899.

W. H. HOWE.

APPARATUS FOR RECORDING VOTES.

(Application filed Oct. 20, 1898.)

(No Model.)

6 Sheets—Sheet 1.

Witnesses.
J. D. Kingsbury
B. W. Brockett

Inventor.
Walter H. Howe
By Whitaker & Prevost attys.

THE NORRIS PETERS CO., PHOTO-LITHO., WASHINGTON, D. C.

No. 628,095. Patented July 4, 1899.
W. H. HOWE.
APPARATUS FOR RECORDING VOTES.
(Application filed Oct. 20, 1898.)
(No Model.) 6 Sheets—Sheet 2.
Fig. 3
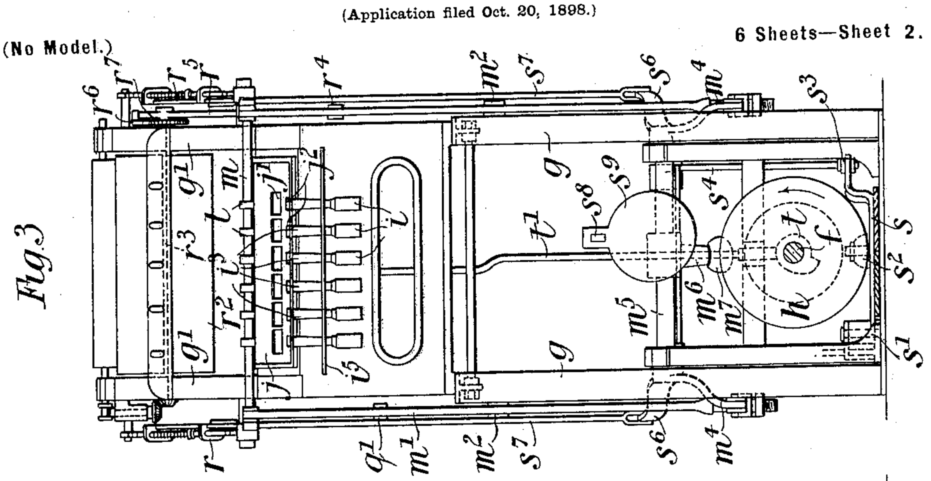
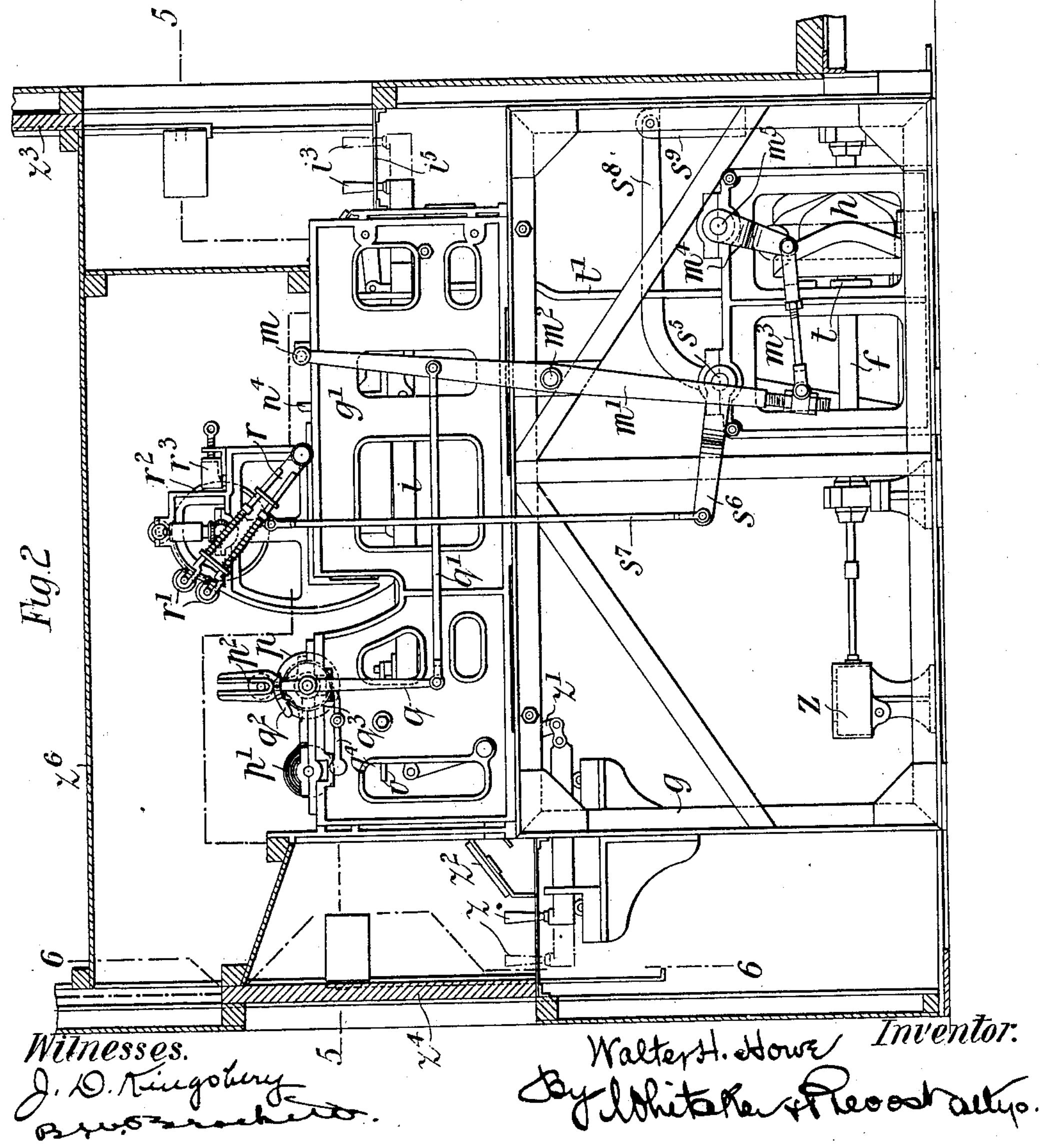
Fig. 2
Witnesses.
J. D. Kingsbury
B. W. Brockett.
Inventor:
Walter H. Howe
By Whitaker & Prevost Attys.
THE NORRIS PETERS CO., PHOTO-LITHO., WASHINGTON, D. C.

No. 628,095.

Patented July 4, 1899.

W. H. HOWE.

APPARATUS FOR RECORDING VOTES.

(Application filed Oct. 20, 1898.)

(No Model.)

6 Sheets—Sheet 3.

Witnesses.
J. D. Kingsbury
B. W. Brockett.

Inventor.
Walter H. Howe
By Whitaker & Prevost Attys.

THE NORRIS PETERS CO., PHOTO-LITHO., WASHINGTON, D. C.

No. 628,095. Patented July 4, 1899.

W. H. HOWE.

APPARATUS FOR RECORDING VOTES.

(Application filed Oct. 20, 1898.)

(No Model.) 6 Sheets—Sheet 4.

Witnesses.
J. D. Kingsbury
B. W. Brockett

Inventor:
Walter H. Howe
By Whitaker & Prevost.

THE NORRIS PETERS CO., PHOTO-LITHO., WASHINGTON, D. C.

No. 628,095. Patented July 4, 1899.

W. H. HOWE.

APPARATUS FOR RECORDING VOTES.

(Application filed Oct. 20, 1898.)

(No Model.) 6 Sheets—Sheet 5.

Witnesses.
J. D. Kingsbery
Benj. Broadhead

Walter H. Howe Inventor.
By Whitaker & Prevost Attys.

THE NORRIS PETERS CO. PHOTO-LITHO., WASHINGTON, D. C.

No. 628,095. Patented July 4, 1899.

W. H. HOWE.

APPARATUS FOR RECORDING VOTES.

(Application filed Oct. 20, 1898.)

(No Model.) 6 Sheets—Sheet 6.

Fig. 18.

| CANDIDATES | | | | | | SCRUTINY. |
|---|---|---|---|---|---|---|
| A | B | C | D | E | F | |
| | 00001 | | | 00001 | | 00001 |
| | | 00001 | 00001 | | | 00002 |
| | 00002 | | | | 00001 | 00003 |
| 00001 | 00003 | | | | | 00004 |
| | | 00002 | | 00002 | | 00005 |
| | 00004 | | 00002 | | | 00006 |
| 00002 | | | 00003 | | | 00007 |
| | | | 00004 | | 00002 | 00008 |
| | 00005 | | | 00003 | | 00009 |
| | | | 00005 | | 00003 | 00010 |

Fig. 19.

| | | |
|---|---|---|
| 1 | 12345 | |
| 2 | 90 | |
| 3 | 181 | |
| 4 | 50603 | |
| 5 | 792 | |
| 6 | 4001 | |
| 7 | 6784 | |
| 8 | 900 | |
| 9 | 12540 | |
| 10 | 4680 | |
| 11 | 32001 | |

Witnesses.
J. D. Kingsbury
B. H. Brockett.

Walter H. Howe Inventor.
By Whitaker & Prevost Attys.

THE NORRIS PETERS CO., PHOTO-LITHO., WASHINGTON, D. C.

UNITED STATES PATENT OFFICE.

WALTER HENRY HOWE, OF LONDON, ENGLAND.

APPARATUS FOR RECORDING VOTES.

SPECIFICATION forming part of Letters Patent No. 628,095, dated July 4, 1899.

Application filed October 20, 1898. Serial No. 694,121. (No model.)

*To all whom it may concern:*

Be it known that I, WALTER HENRY HOWE, a subject of the Queen of Great Britain, residing at London, England, have invented new and useful Improvements in Apparatus for Recording Parliamentary and other Votes, (for which I have applied for a patent in Great Britain, No. 7,266, dated March 25, 1898,) of which the following is a specification.

My invention relates to vote-recording apparatus of the kind described in the specification of former Letters Patent granted to me, No. 592,590, of October 26, 1897.

The apparatus described in the former specification only permitted of a voter voting for one of several candidates or for one set running together. The object of my invention is to simplify the construction of the mechanism and at the same time to provide means whereby the apparatus may be used for recording votes for two or more selected independent candidates simultaneously.

According to my invention I provide as many sets of number-printing apparatus as there are candidates, and I arrange adjacent to the said several sets of numbering apparatus a reciprocating or oscillating bar or device, the movements of which are produced from a single turnstile which the voter in entering the voting-chamber moves through, say, a quarter of a revolution, and in leaving the voting-chamber through, say, another quarter of a revolution. An additional set of number-printing apparatus for printing numbers for scrutiny purposes is also connected to the oscillating bar, so that it prints a number each time the latter reciprocates. The reciprocation of the bar is advantageously effected through the medium of a rotary cam mounted on a shaft geared with the central shaft of the turnstile.

In connection with each set of number-printing apparatus is a pivoted catch designed to be engaged with and disengaged from the oscillating bar, so that those catches which are in engagment with the oscillating bar when the latter is oscillated will cause the operation of their respective sets of numbering mechanism, while the catches of the other sets of numbering mechanism not in engagement with the oscillating bar will remain inoperative. To engage the catches with the oscillating bar, I provide a series of sliding bars having handles which are placed so as to project into the voting-chamber, each of the said bars carrying an inclined plane working in conjunction with its respective catch in such a manner that when a sliding bar is moved in the required direction the catch will be lifted to engage with the oscillating bar, so that on the next oscillation of the latter the connected numbering apparatus will be operated.

A locking apparatus, which is advantageously composed of a series of wedges, is arranged in conjunction with the several sliding bars, so that when the number of bars corresponding with the number of candidates for which a voter may vote has been moved the remaining bars will be locked. In connection with the said sliding bars I arrange indicators in such a manner that when the bar for a certain candidate's apparatus is operated the indicator will appear in proximity to the name of the candidate.

The cam on the shaft hereinbefore described operates the printing-cylinder-inking mechanism, and a stop-cam on the said shaft prevents a voter after having entered the voting-chamber from leaving without voting. The said shaft has also a numbering mechanism in connection with it for showing the total number of revolutions made, and consequently the number of persons who have voted.

To enable my invention to be fully understood, I will describe the same by reference to the accompanying drawings, in which—

Figure 6:
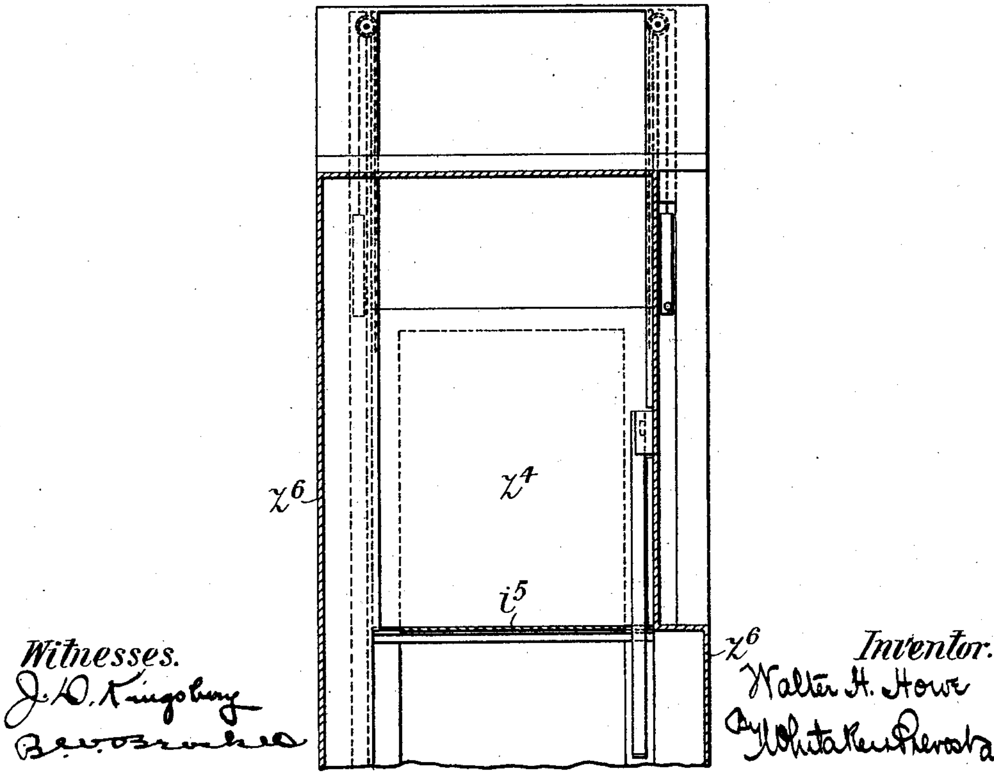
Figures 4, 7, 8:
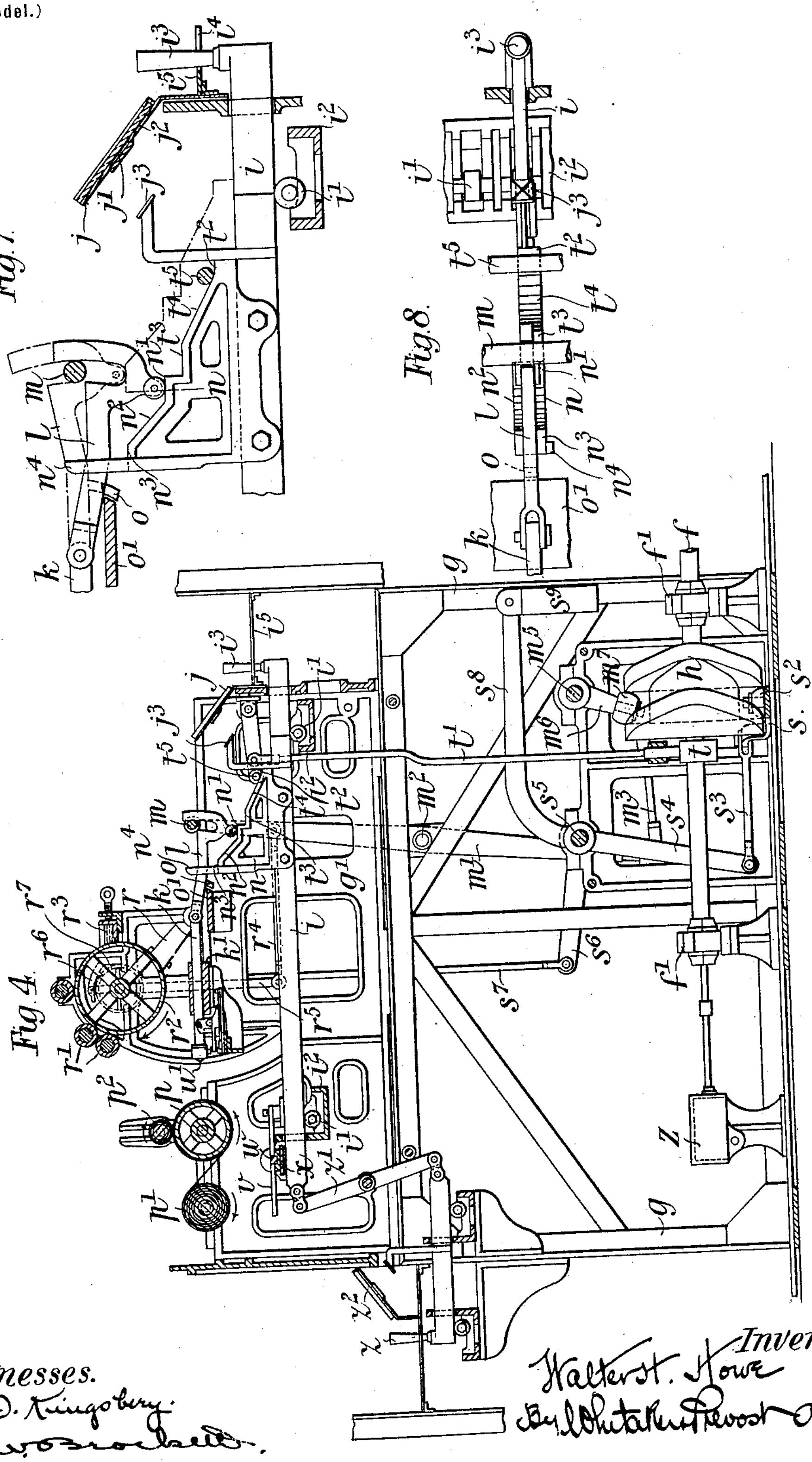
Figure 5:
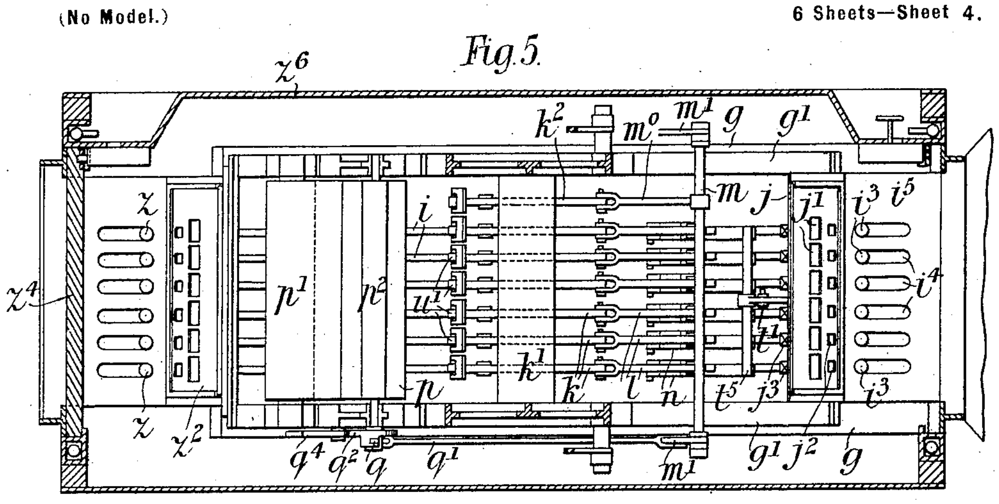
Figure 13:
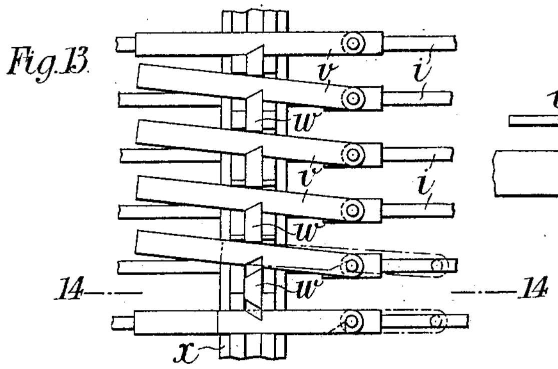
Figure 14:
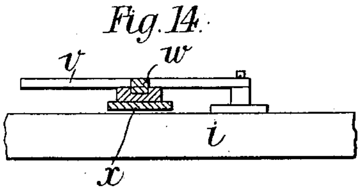
Figures 9, 10, 11, 12:
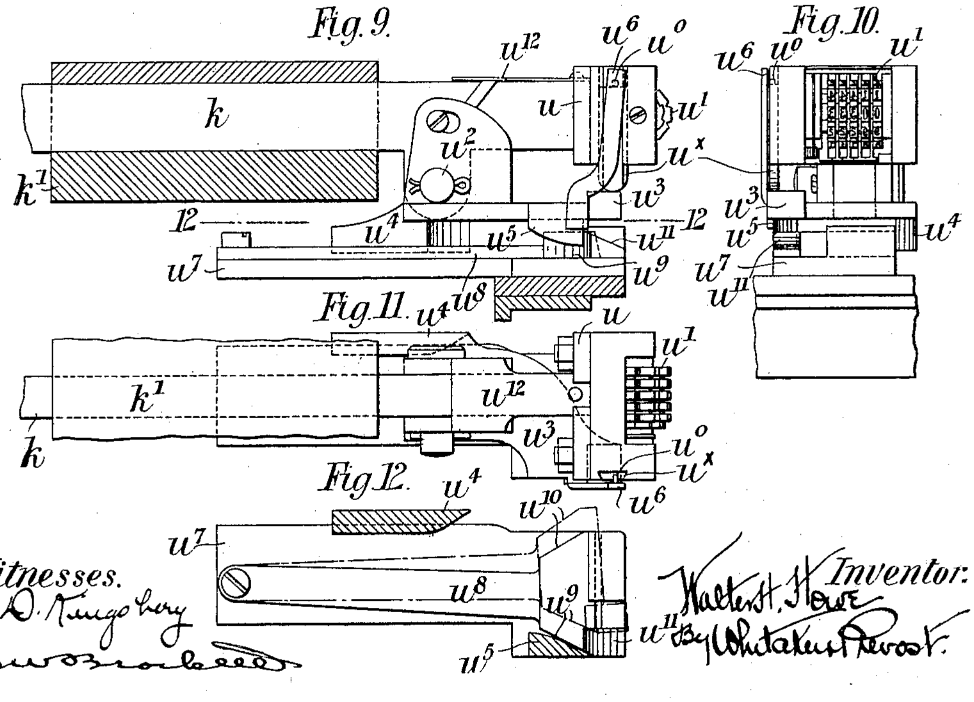
Figures 15, 16, 17:
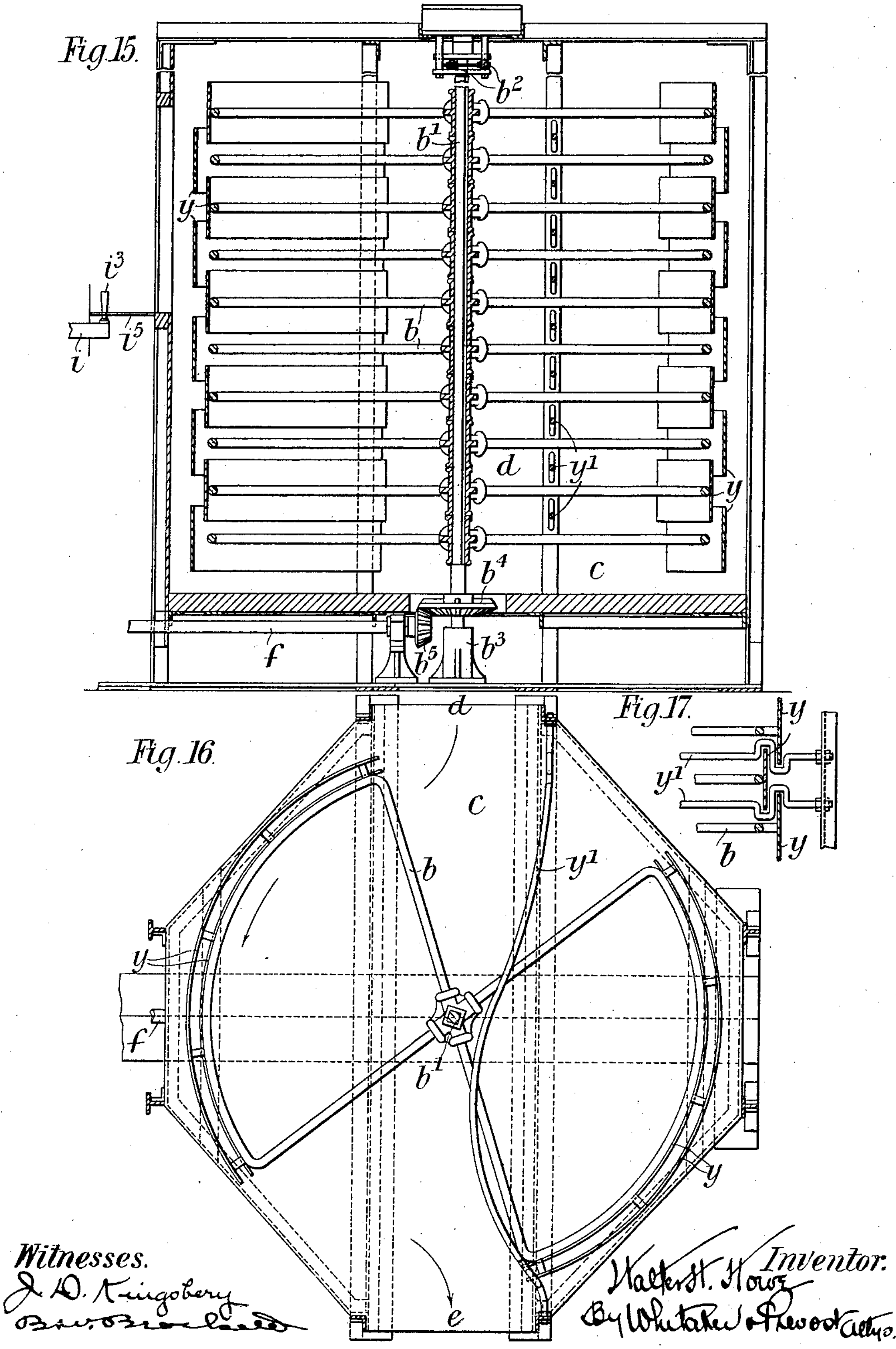

Figure 1 is a diagrammatic view showing the arrangement of my apparatus in connection with the chamber and casing inclosing the same. Fig. 2 is a sectional side elevation through the voting apparatus proper and drawn to a larger scale than Fig. 1. Fig. 3 is a front elevation of the same. Fig. 4 is a longitudinal section through the voting apparatus, drawn to the same scale as Fig. 2. Fig. 5 is a section on the line 5 5, Fig. 2; and Fig. 6 is a section on the line 6 6 of the said Fig. 2. Fig. 7 is an elevation, drawn to a larger scale than Figs. 2 to 6, of the mechanism for locking a number-printing apparatus to the oscillating bar; and Fig. 8 is a plan of the same. Fig. 9 is a sectional side elevation, drawn to a larger scale than Figs. 7 and 8, showing the arrangement of the number-printing apparatus. Fig. 10 is an end elevation, and Fig. 11 is a plan view, of the same. Fig. 12 is a section on the line 12 12, Fig. 9. Fig. 13 is a plan view, drawn to the same scale as Figs. 7 and 8, showing the mechanism for preventing the operation of more than the desired number of printing apparatuses. Fig. 14 is a section on the line 14 14, Fig. 13. Fig. 15 is a vertical section, drawn to a smaller scale than Fig. 2, of the turnstile I use in connection with my apparatus, and Fig. 16 is a sectional plan of the same. Fig. 17 is a section of part of the turnstile hereinafter described. Fig. 18 illustrates the way in which the record of the votes is printed, and Fig. 19 illustrates the record made in the returning-officer's book.

*a* is the voting apparatus proper, and *b* is the turnstile through the medium of which movement is imparted to the said apparatus, the said turnstile, as shown, being arranged in a chamber *c*, having the openings *d e* for the ingress and egress of the voters, respectively, the said openings being arranged in such a manner relatively with the turnstile that a voter in passing through the chamber *c* moves the turnstile through half a revolution. The shaft $b'$ of the turnstile *b*, which is preferably suspended at its upper end upon antifriction-balls $b^2$, as shown in Fig. 15, and at its lower end simply rotates in a steadying bush or bearing $b^3$, has fixed to it near the lower end a gear-wheel $b^4$, which engages with a pinion $b^5$ on the shaft *f*. The relative diameters of the said wheel and pinion are such that the latter makes two revolutions to each revolution of the former—that is to say, one revolution for each movement of the turnstile caused by the entrance and exit of a voter to and from the voting-chamber.

The voting apparatus proper, *a*, comprises an under frame *g*, which in the drawings is represented as being made of T-iron, and two side frames $g' g'$, secured upon the said under frame. The shaft *f* from the turnstile extends below the frame *g*, it being mounted in suitable bearings $f' f'$ and carrying the cam *h*, by means of which movement is imparted to the various parts of the apparatus.

*i i* are the sliding bars, which are moved by the voters when recording their votes, these sliding bars being adapted to run on antifriction-rollers $i' i'$, Figs. 4, 7, and 8, mounted on cross-bars $i^2 i^2$ between the side frames $g' g'$ of the framing. These bars *i i* at one end project into a recess in the wall of the chamber *c* containing the turnstile and are each provided with a handle $i^3$ for enabling them to be operated by the voters, the several handles $i^3 i^3$ projecting through slots $i^4 i^4$ in a plate $i^5$ and having arranged adjacent to them another plate *j*, having in it a series of openings $j' j'$, Figs. 3 and 5, in which the names of the candidates are placed, and a second series of openings $j^2 j^2$, through which indicators $j^3$ (fixed to the bars *i i* so as to move therewith) appear when the said sliding bars are moved. In practice the indicators are preferably marked with an X, as shown in Fig. 8.

*k k* are pushers to which the number-printing devices are connected, the said pushers sliding in a suitable guide $k'$, and $k^2$, Fig. 5, is another pusher carrying the scrutiny-number-printing apparatus.

*l l* are the catches pivoted to the said pushers *k k*, and *m* is the oscillating cross-bar or device with which the said catches are designed to engage. $m^0$, Fig. 5, is a link which permanently connects the oscillating bar *m* to the pusher $k^2$ of the scrutiny-number-printing apparatus. The cross-bar *m* is carried between two levers $m' m'$, pivoted to the under frame *g* at $m^2$, and connected at their lower ends by links $m^3$ to arms $m^4$ $m^4$ upon a shaft $m^5$, having upon it a lever-arm $m^6$, carrying a roller $m^7$, which engages with the groove of the cam *h*, whereby as the said cam rotates the desired amount of oscillation will be imparted to the cross-bar *m*.

Upon each sliding bar *i* is a block *n*, having upon it the flat surface $n'$, the incline $n^2$, and the flat surface $n^3$, as clearly shown in Fig. 7. Normally an antifriction-roller upon the under side of the corresponding catch *l* rests upon the surface $n'$. When, however, the sliding bar *i*, carrying the block *n*, is moved outward, the inclined surface $n^2$ acts against the said antifriction-roller and lifts the catch *l*, so as to cause it to engage with the cross-bar *m*, the horizontal surface $n^3$ being moved below the said antifriction-roller, so as to hold the said catch in such engagement, as indicated by the dotted lines in Fig. 7. This lifting of the catch also moves a stop *o* upon the under side of the said catch above the surface of a stop-plate $o'$. If, now, oscillatory movement is imparted to the cross-bar *m*, it will be obvious that the pushers *k*, the catches *l* in connection with which are in engagement with the said cross-bar *m*, will be caused to reciprocate. The oscillating cross-bar *m* is so arranged that it moves above the tops of those catches which are not in engagement with it.

$n^4$ is a horn or upward extension on each of the blocks *n*, so arranged that when its bar *i* is moved forward by a voter the horn will be moved into the path of the cross-bar *m*, so that during the backward oscillation of the latter the said bar *i* will be moved back to its normal position.

*p* is an impression-roller which is arranged in such proximity to the several sets of number-printing apparatus that the latter in their extreme rearward position will print upon the paper web passing over the said impression-roller.

$p'$ indicates the roll of paper to be printed, and $p^2$ the paper upon which the printing has taken place. The step-by-step forward movesay, a position which allows of the turnstile moving through a quarter of a revolution in order to permit the entrance of a voter into the voting-chamber.

The number-printing apparatus which I conveniently employ is that known as "Schoeder's;" but I advantageously provide the following means for imparting the movement to the units-wheel ratchet and reciprocation of either of the pushers d. To each pusher h (on a flange a at the end of which the number-printing apparatus is attached, as shown at $u'$, Figs. 9, 10, and 11) I pivot at $u^2$ a lever $u^3$, having upon its underside two beveled lips or lugs $u^4$ $u^5$, Figs. 9 and 12, and secured to or near its arm $u^6$, provided with a projection $u^7$ at its upper end, the said lever and projection embracing between them the usual reciprocating slide $u^8$, which is connected to the units-wheel of the numbering apparatus. Upon each of a series of plates $u^9$, fixed to the cross-plate carrying the guides h' of the pushers d, is pivoted what I will term a "switch-cam" $u^{10}$, having at its front end the inclines $u^{11}$, $u^{12}$, and $u^{13}$. The operation of the lever $u^3$ in conjunction with this switch-cam is as follows—that is to say: when the pusher d moves backward in order to bring the number-printing apparatus in contact with the paper the lug $u^4$ on the said lever $u^3$ acts against the incline $u^{11}$ on the switch-cam $u^{10}$ and moves the latter from the position shown in full lines in Fig. 12 to that shown by the dotted lines. As the movement of the pusher d continues the lug $u^4$ impinges against the inclined surface $u^{12}$ and moves the said switch-cam $u^{10}$ back to its original position. This movement has the effect of placing the inclined surface $u^{13}$ in the path of the lug $u^5$, so that on the return movement of the pusher d after printing the said lug is caused to ride up the said incline and so cause the oscillation of the lever $u^3$ and of the arm $u^6$, through the medium of which the number-wheels are operated. When the pusher d is in its normal or most forward position, the lug $u^5$ is in front of the incline $u^{13}$ ready for the next operation, as shown in Fig. 12. A spring $u^{14}$, which acts upon the lever $u^3$, serves to return the said lever to its normal position after it has been moved by the incline $u^{13}$.

Any suitable means may be provided for permitting of the operation of one, two, or more of the sliding bars h by the same person. The arrangement which I have made use of, and which is clearly shown in Figs. 13 and 14 of the drawings, is similar to that shown for interlocking the levers of railway-signals and comprises a series of locking-bars n n, pivoted to the sliding bars h j, and a series of wedge-blocks n n n, sliding in a transverse guide x and engaging with notches in the sides of the locking-bars n. The wedges n n n vary in length according to the number of bars which are to be operated simultaneously. In the drawings the wedges are shown of a length necessary to allow any two bars to be operated while all the others remain locked. It is to be understood, however, that the length of the wedges can be such that only one bar or a greater number than two may be operated.

The operation of the apparatus hereinbefore described is as follows: Assume the parts to be in the position shown in Figs. 1, 2, and 3 and that there are six candidates A, B, C, D, E, F, any two of whom a voter may vote for. If, now, a voter enters the chamber *c* through the entrance *d*, he moves the turnstile through a quarter of a revolution, which has the effect of causing the turnstile to close the entrance behind him and to uncover the aperture or recess in the side of the chamber wherein the handles $i^3$ $i^3$ are located, while at the same time the stop-cam *t* is brought around against the bolt *t'*. The voter now selects the handles corresponding with the two candidates whom he desires to vote for (or one handle only if he is only giving one of two votes) and pulls them toward him in the slots $i^4$ $i^4$, the effect of which is to raise the corresponding catches *l l* into engagement with the oscillating cross-bar *m* and to lift the bolt *t'* out of engagement with the stop-cam *t*. As the voter leaves the chamber he rotates the turnstile through a further quarter of a revolution, which causes the oscillating cross-bar *m* to move the pushers *k* (the catches of which are in engagement with the oscillating cross-bar *m*) with their printing mechanisms and to print the numbers upon the paper web, the cross-bar *m* at the same time returning the bars *i* (that have been moved) to their normal position by impinging against their horns $n^4$. The cross-bar *m* then returns the said printing mechanisms to their normal positions ready for operation by the next voter.

The method of recording the votes is as follows and will be understood by reference to Figs. 18 and 19: The first voter who presents himself at a voting-station has, say, the rate-book No. 12,345. The presiding officer, having recorded this number against the number "1" of the consecutive numbering at the side of the page in his book, as shown in Fig. 19, allows the voter to enter the chamber, where he pulls the handles corresponding with, say, candidates B and E, so that as he leaves the chamber the number "1" is printed under both B and E on the paper web in the apparatus and the corresponding number "1" in the scrutiny-column. Voter No. 2 has, say, rate-book No. 90. He votes for candidates C and D, so that the number "1" is printed beneath C and D, while the number "2" is printed in the scrutiny-column. Voter No. 3 has rate-book No. 181. He votes for candidates B and F, the result being that the number "2" is printed under B and the number "1" under F, while the number "3" appears in the scrutiny-column. Voter No. 4, with rate-book No. 50,603, votes for A and B, so that the number "1" is printed under A, while the number "3" is printed under B and the number "4" in the scrutiny-column, and so on. It will thus be understood that the last number printed under each candidate's name represents the total number of votes which have been polled for him, while the numbers in the scrutiny-column correspond with the numbers in the presiding officer's book, against which are inserted the rate-book numbers of the voters, so that in case of a scrutiny the votes can be easily identified.

In cases where scrutiny is not to be provided for the scrutiny-number-printing mechanism may be dispensed with. It is preferable, however, to retain it as a proof of the accuracy of the record of votes. For instance, first, the sum of the totals registered for all the candidates equals the total of the votes for the day when one candidate only is voted for, and when more than one candidate is voted for the sum of the totals registered for all the candidates will be as many times greater than the total of the votes for the day as that total multiplied by the number of candidates to be elected, or, second, the total of the votes for the day multiplied by the number of candidates to be elected will equal the sum of the totals registered for all the candidates plus the votes which the electors for private reasons have chosen to withhold.

In order to conceal the person within the voting-chamber from view, the turnstile at those parts which are opposite to the entrance and exit of the chamber when the voter is within the said chamber are provided with overlapping plates, as shown at *y* in Figs. 15 and 16, and the usual dividing-bars *y' y'*, which project between the bars of the turnstile to prevent a person walking around one side of the same, are bent at the ends, as clearly shown in Fig. 17, so as to pass between the said overlapping plates *y y*.

In order to adapt my apparatus for use by cripples and other persons incapable of walking, I provide that the sliding bars *i i* may be operated from a special chamber at the rear end of the apparatus *a*, as shown in Fig. 1, and for this purpose I arrange in connection with each of the said sliding bars *i i* a second handle, as shown at *z* in Figs. 2 and 4, the said handle being attached to a bar connected with the bar *i* by a suitable lever *z'*. These handles *z z* are arranged in conjunction with a plate $z^2$, having a set of openings for containing the names of the candidates and another set of openings for showing an indicator similar to the openings *j'* $j^2$ hereinbefore described.

Adjacent to the handles $i^3$ is a sliding door $z^3$, Fig. 2, and adjacent to the handles *z* is another sliding door $z^4$. These sliding doors are arranged so that they cannot both be opened simultaneously, and for this purpose they are provided with a lock having a key common to both, and the key-locks being so constructed that when either door is open the key cannot be removed therefrom, so as to insure that when a person is voting in the chamber *c* another person cannot be noticing how the voting is taking place at the other end of the apparatus, and vice versa. In case a person desires to vote by the handles *z z* the presiding officer closes the door $z^3$ and locks it, when he can remove the key, with which he can then unlock and open the sliding door $z^4$. In order to record the vote corresponding with the handles *z z* pulled, it will be necessary for a person to walk through the turnstile, but in doing so he will not be able to see how the votes have been given, having regard to the fact that the shutter $z^3$ will be closed. Suitable doors $z^5$ $z^5$, Fig. 1, are provided at the back of the apparatus, which will be opened in case of necessity to admit a bath-chair or other vehicle.

The whole of the part *a* of the apparatus in addition to being inclosed in the chamber to which the doors $z^5$ give access is also surrounded by an independent casing $z^6$, so that the interior of the apparatus is in no way inaccessible.

Z is a recorder which serves to indicate the number of revolutions made by the shaft *f* and the number indicated by which should correspond with the total number of votes recorded and with the number printed by the scrutiny-printing apparatus.

Although I have described the numbering-apparatus as being provided with ordinary printing-type, it is to be understood that any suitable means may be provided for producing the impression upon the record-web. For instance, the type may be arranged to punch or prick the paper, in which case the inking mechanism and the operating device therefor being dispensed with, the impression-roller or its equivalent is retained to support the paper during the punching or pricking operation.

Having now particularly described and ascertained the nature of my said invention and in what manner the same is to be performed, I declare that what I claim is—

1. In apparatus for recording votes, the combination of a series of sliding pushers, number-printing apparatus attached to the said pushers and adapted to be operated by the reciprocation of the latter, a turnstile operated by the voters, means for transmitting the motion of the turnstile to an oscillating or reciprocating device, catches or the like for connecting the said pushers with the said reciprocating device and a series of bars or the like designed to be moved by the voter and means in connection with the said bars for causing the catches to engage with the reciprocating device, means for interlocking the bars or the like so that only a predetermined number of them can be operated at one time and a scrutiny-number-printing apparatus connected with the oscillating or reciprocating device and moving therewith, substantially as described.

2. In apparatus for recording votes, the combination of a series of sliding bars, means for interlocking the said bars so that only a certain number of them can be moved at one time, a series of sets of number-printing apparatus, a turnstile, means for transmitting the motion of the turnstile to a bar or slide and causing it to oscillate or reciprocate, catches for enabling the sets of number-printing apparatus to be connected with the oscillating or reciprocating bar or slide, inclines upon the sliding bars for operating the said catches to cause any predetermined number of them to engage with the oscillating or reciprocating bar or slide, a bolt for stopping the rotation of the turnstile after it has been moved through a certain distance and other inclines upon the sliding bars for withdrawing the said bolt when the sliding bars are moved to record a vote, substantially as described.

3. In apparatus for recording votes, the combination of a turnstile operated by the voters entering and leaving the voting-chamber, a shaft operated by the said turnstile, a cam upon the said shaft, a bar or device adapted to be oscillated or reciprocated and levers and rods for transmitting the motion of the cam to the said bar or device, a series of number-printing apparatuses adapted to be connected with the said bar or slide, sliding rods operated by the voter for controlling the connection between the said bar and the number-printing apparatuses, an independent set of number-printing apparatus permanently connected with the said bar and printing each time that the bar is oscillated or reciprocated, inking apparatus also operated from the cam through the medium of which the printing apparatuses are operated, an impression-roller against which the printing apparatuses are designed to print which impression-roller receives a step-by-step movement from a suitable part of the machine and paper-carrying rollers adapted to carry a paper web for receiving the impressions, substantially as described.

4. In apparatus for recording votes, the combination with a number of sets of number-printing apparatus, of a turnstile for operating the said sets of printing apparatus, of sliding bars for controlling the operation of the said number-printing apparatuses and of a series of auxiliary handles *z* connected with the said bars for enabling votes to be recorded without the voter himself operating the turnstile, substantially as described.

5. In apparatus for recording votes wherein a series of sliding bars having handles and serving to control the operation of several sets of number-printing apparatus is employed, the combination with the said bars of shutters for concealing the said handles and so arranged that when one shutter is open the other is closed and vice versa, substantially as described.

WALTER HENRY HOWE.

Witnesses:
JOHN E. BOUSFIELD,
C. G. REDFERN.